(12) United States Patent
Osborne et al.

(10) Patent No.: US 7,260,602 B2
(45) Date of Patent: Aug. 21, 2007

(54) SYSTEM AND METHOD OF NETWORK CONTENT LOCATION FOR ROAMING CLIENTS

(75) Inventors: Kenneth Mark Osborne, Sammamish, WA (US); Deepak Kumar, Kirkland, WA (US); Gopal Parupudi, Issaquah, WA (US); John Leo Ellis, Sammamish, WA (US); Michael J. Healy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 857 days.

(21) Appl. No.: 10/403,699

(22) Filed: Mar. 31, 2003

(65) Prior Publication Data

US 2004/0193702 A1 Sep. 30, 2004

(51) Int. Cl.
*G06F 15/16* (2006.01)
(52) U.S. Cl. .................. 709/203; 709/218; 709/227; 370/238
(58) Field of Classification Search .............. 709/203, 709/218, 227; 370/238
See application file for complete search history.

(56) References Cited

U.S. PATENT DOCUMENTS 6,253,230 B1 * 6/2001 Couland et al. ............ 709/203
6,671,259 B1 * 12/2003 He et al. .................... 370/238
7,039,709 B1 * 5/2006 Beadle et al. ............... 709/227
2001/0049713 A1 * 12/2001 Arnold et al. .............. 709/105
2006/0168104 A1 * 7/2006 Shimizu et al. ............. 709/218

OTHER PUBLICATIONS

Maass, Henning, "Location-aware mobile applications based on directory services," Mobile Networks and Applications 3, (1998) Baltzer Science Publishers BV, pp. 157-173.

* cited by examiner

*Primary Examiner*—Jinsong Hu
(74) *Attorney, Agent, or Firm*—Lee & Hayes, PLLC

(57) ABSTRACT

A system and method to select a software distribution server to download content from a server to a client, and to execute content on the server for the client, is described. The system and method include a client able to couple to any of the regions of a multi-region network. The client queries a server system for an identification of network software distribution servers. The client and/or server system select the software distribution server according to criteria that include in one implementation the network location of the client and the software distribution servers. In one implementation, the network is a multi-LAN network and the client and/or server system select the software distribution server coupled to the same LAN as the client. In one implementation, the client queries a server for an identification of network management servers on the network, selects a network management server coupled to the same LAN as the client, and queries the selected network management server for an identification of a software distribution server.

18 Claims, 10 Drawing Sheets

SYSTEM AND METHOD OF NETWORK CONTENT LOCATION FOR ROAMING CLIENTS

TECHNICAL FIELD

This invention relates generally to a server to download or executing content on a network, and more particularly but not exclusively relates to systems and methods to select a server to download or execute content for a client.

BACKGROUND

An enterprise network typically includes sites each comprising a Local Area Network (LAN). Each site includes a site server infrastructure, and ports to couple the LAN to managed client computers. The server infrastructure includes a network management server function and a software distribution server function. The network management server function administers managed client computers. The software distribution server function both stores client software for remote execution from or download to client computers, and selectively downloads the stored software content over the network to the managed client computers.

Enterprise LANs are selectively connected, commonly in a hierarchical structure, by Wide Area Networks (WANs). A managed client is typically assigned to a specific site, specifically to both a site network management server and a site software distribution server. As the use of mobile computers such as laptops increases within enterprises, managed clients now regularly move between different network localities. If these moving clients obtain content from the assigned site, irregardless of location within the network, the transmission path from a site software distribution server to the client will include a connecting WAN, and the transmission rate though the WAN will limit the download rate to the client.

A WAN typically includes regions connected by routing devices and the like. A managed client coupled to the WAN is typically assigned to a network management server, and to a software distribution server, each coupled to specific sub-regions of the WAN. A moving processing unit however may couple to the WAN at a sub-region that is at least one hop from the assigned software distribution server sub-region. If the moving processing unit obtains content from the assigned software distribution server, the transmission path from the software distribution server to the processing unit thus includes at least one hop. The transmission from the software distribution server to the client may be degraded by being coupled to a different sub-region than the software distribution server is coupled.

SUMMARY

Briefly, a system and method to select a software distribution server to download and/or execute content to/for a client coupled to a network is described. The client is able to couple to multiple sub-regions of the network.

In one exemplary embodiment, the network comprises multiple sub-regions connected to one another. Multiple software distribution servers are configured to store and to access a software package. The access includes a downloading of the software package to a client and/or an execution of the software package for a client. Each software distribution server is coupled to one of the sub-regions of the network. The client is coupled to one of the sub-regions at a network location, and configured to request an access of at least one of the software packages for the client from one of the software distribution servers based on at least one criterion.

In one exemplary embodiment a method comprises coupling the client to one of the sub-regions, selecting a software distribution server based on a selection criteria, and accessing the software package from the selected software distribution server for the client.

DETAILED DESCRIPTION

Figure 1:
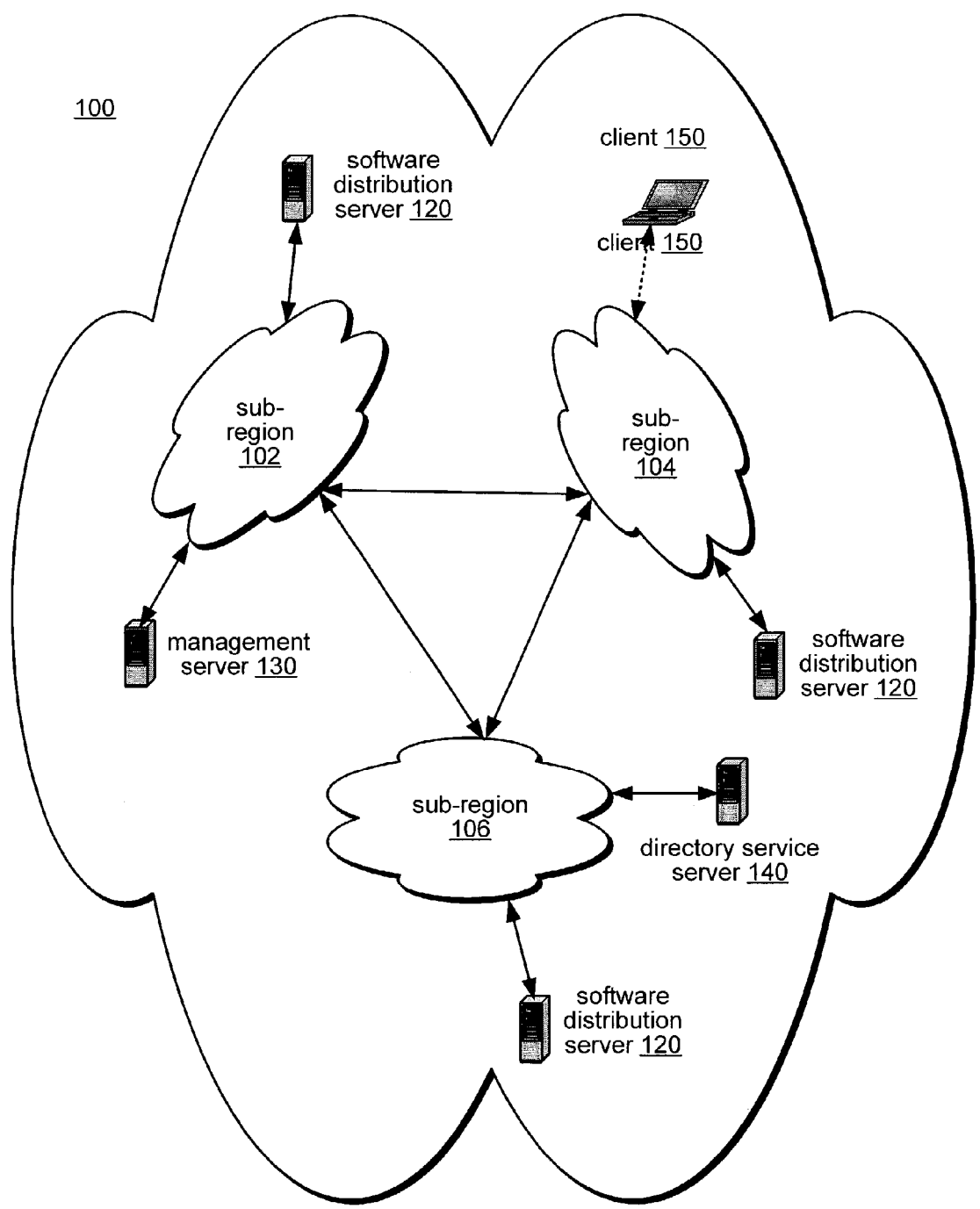
FIG. 1 portrays an exemplary network having sub-regions. The network includes a client coupled to the network at any of multiple locations, software distribution servers coupled to the network at multiple locations, and directory service and network management servers coupled to the network in order to download to the client an identification of an appropriate distribution server.

As described herein, and portrayed with reference to FIGS. 1, 2, 3, 4A-4B, 5A-5C, and 6A-6B, are a software distribution server 120, a network management server 130, a directory server 140, a client 150, and a network server system 180. Each software distribution server 120, network management server 130, directory server 140, client 150, and network server system 180 include a memory that stores an at least one separate routine, and an at least one processor configured to execute the separate routine. In executing the routine, the processor of the software distribution server 120, the network management server 130, the directory server 140, the client 150, and the network server system 180, cause respectively the software distribution server 120, the network management server 130, the directory server 140, the client 150, and the network server system 180 to perform the actions described herein.

Referring now to FIG. 1, a network 200 includes illustrative multiple sub-regions 102, 104, and 106. In one implementation, the sub-regions 102, 104 and 106 are each LANs that are connected by way of illustrative wide area networks (WANs). This implementation is further described with reference to FIGS. 2 and 3. In one implementation, the network 100 is a WAN, and the sub-regions 102, 104, and 106 are each WAN sub-regions. These WAN sub-regions 102, 104, and 106 are each coupled to one another by a switching device (not shown). Each sub-region is therefore at least one hop from another sub-region. Thus a transmission from a node in any sub-region 102, 104, 106 to a node in another sub-region 102, 104, 106 makes at least one hop from the transmitting sub-region to the destination sub-region.

A plural number of software distribution servers 120 are coupled to the network 100. A software distribution server 120 is commonly termed a "distribution server," a "network distribution point," and the like. A software distribution server 120 is configured to store software distribution packages, and to access the software packages including downloading the software packages to and/or running the software packages for a requesting client computer (hereinafter "client") 150 at least one of the stored software distribution packages. Separate software distribution servers 120 are coupled to multiple nodes of the network 100, often to at least each sub-region of the network 100.

At least one network management server 130 is coupled to the network 100. Illustratively a network management server 130 is coupled to the network 100 at the sub-region 102. In one implementation, a network management server 130 is collocated with a software distribution server 120.

A network management server 130 is configured to communicate with a client, such as by means of HTTP messages and commands. Commonly, a client 150 coupled to the network is assigned to a specific network management server 130. Conversely a network management server 130 is assigned to at least one client 150. A network management server 130 provides administrative services to its assigned clients, as well as administrative services for specific software distribution servers 120. As such, a network management server 130 is commonly termed a "network management server," an "administrative server," a "management point," and the like.

The network management server 130 is queried by assigned clients for policy instructions, e.g. whether it is appropriate to install or to update software, what is the identity of the software to install, and when to install that software. Furthermore, the network management server 130 responds to policy instruction queries with the requested data. A network management server 130 is configured to store the network identifications of the software distribution servers, as well as selection criteria for a client 150 to select a software distribution server 120 for download and/or execution of a software package. The selection criteria illustratively includes software distribution server responsiveness, and whether the software distribution server is to download and/or execute software for a client not coupled to the same sub-region.

In one implementation the network management server 130 is configured to select a software distribution server 120 for a requesting client. The selection is based on the network locations of the software distribution servers 120 and the client 150 and/or the other selection criteria. In one implementation, the network management server selects a software distribution server based on having the fewest hops if any to the client. In one implementation, the network management server 130 downloads to the requesting client at least one selection criteria metric for each of at least one software distribution server 120. The selection criteria metric include a software distribution server identification from which a network location is derived, commonly a location or a network address, as well as the other selection criteria for selecting a software distribution server 120. In this implementation, the client 150 is configured to select one of the downloaded software distribution server 120 identifications based on the network location of the software distribution and/or the other selection criteria.

The network 100 may include a directory service server 140. A directory service is typically a network lookup service that identifies resources on a network, and makes these identified resources available to network users and applications. In one implementation the directory service server 140 is configured to store an identification of the network management servers 130. The client 150 is configured to request from the directory service server 140 the identifications of the stored network management server(s) 130. In response, the directory service server 140 is configured to download to the client 150 the identifications of the stored network management server(s) 130. The client is configured to select a downloaded network management server.

A "roaming" client 150 is able to couple to the network 100 at one of any of the sub-regions 102, 104, and/or 106 at any given time or couple to the network 100 through a device coupled to the network 100 at any of the sub-regions 102, 104, and/or 106 at any given time. FIG. 1 portrays a single client 150 that is not fixed to any one sub-region but can instead be coupled (directly as portrayed or alternatively through a device) to any one of the sub-regions at a given time. A dashed line connects the client 150 to a sub-region to indicate that the specific client 150 is coupled to one sub-region at a time. Conventionally, a client is coupled to a fixed location on a network, and assigned to a fixed software distribution server 120 coupled to the same sub-region or the closest sub-region to which the client is coupled. However, if a client roams to a different sub-region from the fixed location and the client downloads (or executes) software packages from the same assigned fixed software distribution server 120, the transmission path will be across an at least one sub-region. In the implementation in which LANs are connected by WANs, the transmission will thus be limited by a WAN transmission bandwidth. In the implementation in which the network 100 comprises WAN sub-regions, a transmission from one sub-region to another sub-region may degrade the transmission or being incompatible with protocols.

The client 150 is configured to request from a network management server 130 software distribution server selection criteria metrics. The selected network management server 130 downloads to the client a selection criteria metric of at least one software distribution server. The client 150 selects one of the downloaded software distribution servers 120 based on the downloaded selection criteria metrics. The client 150 requests that the selected software distribution server access a software package for the client 150 including downloading the software package to the client 150 and/or executing the software package for the client 150.

In one implementation, the client 150 selects a software distribution server 120 based on the network locations of the software distribution servers 120 and the client 150 and/or the other selection criteria downloaded in the selection criteria metric for each of the downloaded software distribution server identifications. In one implementation, the client 150 selects a software distribution server 120 based on the quantity of hops from the software distribution servers 120 to the client 150.

Figure 2:
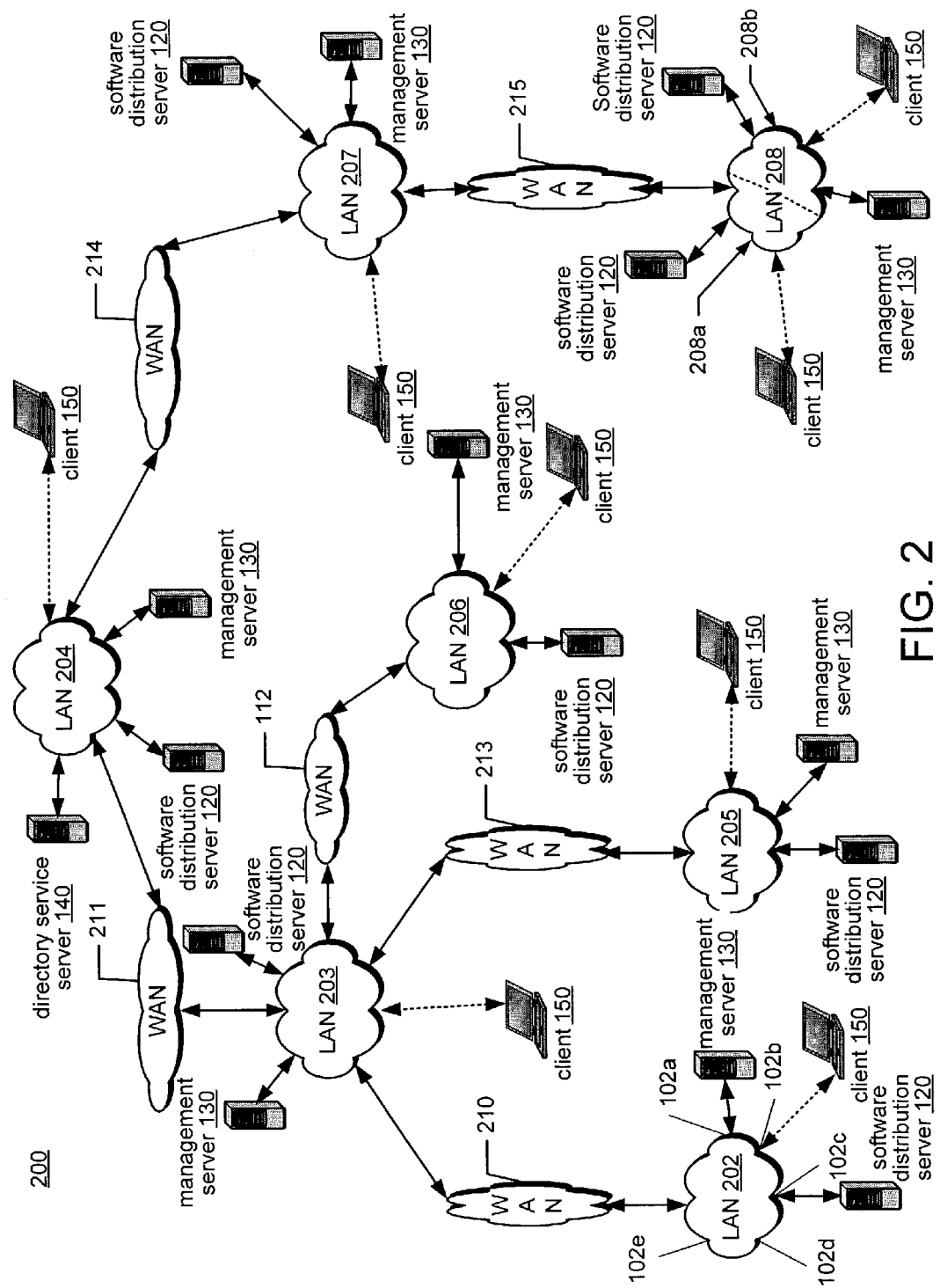
FIG. 2 portrays an exemplary network having LANs connected to one another. The network includes a client coupled to the network at any of multiple locations, software distribution servers coupled to the network at multiple locations, and a directory service and network management servers coupled to the network in order to download to the client an identification of an appropriate distribution server.

Referring now to FIG. 2, a network 200 includes multiple LANs 202, 203, 204, 205, 206, 207, 208. Each LAN 202, 203, 204, 205, 206, 207, 208 is coupled to one another in an exemplary configuration. Each LAN may additionally comprise multiple sub-networks, such as illustratively the LAN 208, which comprises the multiple sub-networks 208a and 208b. Each LAN 202, 203, 204, 205, 206, 207, 208 includes multiple nodes for coupling devices to the LAN. Thus the LAN 202 includes the multiple five nodes 202a, 202b, 202c, 202d, and 202e for separately coupling at least five devices to the LAN 202, one device nominally at each node. In actual practice, the nodes on a LAN may number in the thousands.

Each LAN 202, 203, 204, 205, 206, 207, 208 is generally coupled to at least one other LAN 202, 203, 204, 205, 206, 207, or 208, by way of exemplary connecting wide area networks (WANs) 210, 21211, 212, 213, 214, and 115. Thus, WAN 210 connects to both LAN 202 and LAN 203, and couples LAN 202 to LAN 203. WAN 21211 connects to both LAN 203 and LAN 204, and couples LAN 203 to LAN 204. WAN 212 connects to both LAN 203 and LAN 206, and couples LAN 203 to LAN 206. WAN 213 connects to both LAN 203 and LAN 205, and couples LAN 203 to LAN 205. WAN 214 connects to both LAN 204 and LAN 207, and couples LAN 204 to LAN 207. WAN 115 connects to both LAN 207 and LAN 208, and couples LAN 207 to LAN 208. However, because a WAN is coupling one LAN to another LAN, a transmission from one LAN to another LAN is limited by the connecting WAN transmission bandwidth.

A plural number of software distribution servers 120 are coupled to the network 200. A software distribution server 120 has been described with reference to FIG. 1. At least one separate software distribution server 120 is generally coupled to each LAN of the network 200 so that on each LAN, a software distribution server 120 can download (and/or execute) a software distribution package to a client that is coupled to the same LAN as the software distribution server 120. Illustratively, a software distribution server 120 is coupled to the LAN 202 at the node 202c. And similarly, a separate software distribution server 202 is coupled to each of the other LANs 203, 204, 205, 206, and 207. A LAN having multiple nodes may be partitioned into multiple sub-networks, with each node a constituent of one sub-network or the other. At least one separate software distribution server 120 is commonly coupled to each sub-network. On a LAN having multiple sub-networks, commonly a software distribution server 120 is operated to access a software distribution package for clients, including downloading a software package to the clients and executing a software package for the clients that are coupled to a specific sub-network of the LAN. The LAN 208 includes illustratively two sub-networks 208a and 208b, and a separate software distribution server 120 is illustratively coupled to each of the sub-networks 208a and 208b, so that two software distribution servers 120 are coupled to the LAN 208.

At least one network management server 130 is coupled to the network 200, commonly to each LAN of the network 200. Illustratively a network management server 130 is coupled to the LAN 202 at the node 202a. And similarly, a separate network management server 130 is coupled to each of the other LANs 203, 204, 205, 206, 207, and 208. In one implementation, a network management server 130 is collocated with a software distribution server 120. A network management server 130 is described with reference to FIG. 1. Commonly, a client coupled to the network is assigned to a specific network management server 130 (commonly termed "assigned to a site," the term "site" being the LAN, or the LAN sub-network, to which the network management server 130 is coupled). Conversely a network management server 130 (or network management server site), is assigned to at least one client.

In one implementation the network management server 130 is configured to select a software distribution server 120. The selection is based on the network locations of the software distribution servers and the client and/or other selection criteria such as software distribution server responsiveness and whether the software distribution server 120 is to download/and or execute for a client 150 that is not coupled to the same sub-network. In one implementation, the client is not considered to be located on a LAN if the client is connected to the LAN indirectly, such as through a telephone connection or the like, even though the client's network address may indicate that the client is coupled to the LAN. This will apply when a client is coupled to a LAN through a remote access service (RAS) or the like. In one implementation, the network management server 130 transmits to the requesting client at least one selection criteria metric for selecting a software distribution server 120 associated with a stored software distribution server 120. The selection criteria include a software distribution server identification from which a network location is derived, commonly a location or a network address. The selection criteria may also include in one implementation other criteria such as software distribution responsiveness, and whether the software distribution server 120 is to download and/or execute for a client 150 that is not coupled to the same sub-network. In this implementation, the client is configured to select a software distribution server 120 based on the network location of the software distribution and/or the other selection criteria.

Commonly, a network 200 is arranged in a management hierarchy in which a specific network management server 130 that is coupled to a specific LAN, is configured to administer other network management servers 130. Generally, these other network management servers 130 are coupled to LANs that are connected to the specific LAN. These other network management servers 130 are in turn configured to administer yet other network management servers 130, and so forth. Again, these other network management servers are generally coupled to LANs that are connected to a LAN to which the administrating network management servers are coupled. Illustratively, the network management server 130 that is coupled to the LAN 204 is configured to directly administer the network management servers that are coupled to the LANs 203 and 207. The network management server 130 that is coupled to the LAN 204 administers the network management servers that are coupled to the LANs 202, 205, 206, and 208. Thus, the network management server that is coupled to the LAN 204 is above the network management servers 130 that are coupled to the LANs 202, 203, 205, 206, 207, and 208 in the hierarchy. The network management server 130 that is coupled to the LAN 203 administers the network management servers 130 that are coupled to the LANs 202 and 205.

Thus, the network management server 130 that is coupled to the LAN 203 is above the network management servers 202 and 205 in the hierarchy. The network management server 130 that is coupled to the LAN 207 administers the network management servers 130 that are coupled to the LAN 208. Thus, the network management server 130 that is coupled to the LAN 207 is above the network management servers 130 that are coupled to the LAN 208 in the hierarchy.

A specific network management server 130 provides policy data to each network management server 130 below the specific network management server 130 in the hierarchy. The specific network management server 130 downloads software distribution packages to each software distribution server 120 managed by the specific network management server 130. The specific network management server 130 downloads software distribution packages to each network management server 130 below the specific network management server 130 in the hierarchy (or alternatively directly to each software distribution server 120 below the specific network management server 130 in the management hierarchy). The specific network management server 130 stores and transmits to a requesting client the identification, commonly a location or a network address, of each network management server 130 below the specific network management server 130 in the hierarchy (or alternatively downloads to the client the selection criteria metric of each software distribution server 120 coupled to a LAN in the hierarchy).

A "roaming" client 150 is able to couple to the network 200 at one of any of the network LANs 202, 203, 204, 205, 206, 207, and/or 208, including each of the sub-networks 208a and 208b, at any given time. FIG. 2 portrays a single client 150 that is not fixed to any one LAN, but can instead be coupled to any one of the LANs at a given time. A dashed line connects the client 150 to a LAN (or sub-network of a LAN) to indicate that the specific client 150 is coupled to one LAN at a time. The client 150 may illustratively be a laptop computer whose operator may couple the client 150 to the network 200 at any of multiple network locations, illustratively the LANs 202, 203, 204, 205, 206, 207, and 208, to receive a downloaded software package from a software distribution server 120. Conventionally, a client is coupled to a fixed location on a network, and assigned to a fixed software distribution server 120 coupled to the same LAN to which the client is coupled. However, if a client roams to a different LAN from the fixed location and the client downloads (or executes) software packages from the same assigned fixed server 120, the transmission path will be across an at least one WAN, and thus be limited by a WAN transmission bandwidth.

The network 200 includes a directory service 140. A directory service 140 is typically a network lookup service that identifies resources on a network, and makes these identified resources available to network users and applications. An implementation of a Directory Service is based on the current X.500 International Telecommunications Union (ITU) standard. Illustrative directory service systems are Active Directory (a registered trademark and product of the Microsoft Corporation), Novell eDirectory (a product of Novell Inc.), and Netscape Directory Server (a registered trademark and product of the Netscape Communications Corporation). A directory service is generally comprised of multiple directory service servers, each coupled to a distinct LAN of a network. In one implementation, a directory service server is coupled to each LAN of a network. An illustrative directory service server 140 is coupled to the LAN 204.

In one implementation the directory service server 140 is configured to store an identification of the network management servers 130. The client 150 is configured to request from the directory service server 140 the identifications of the stored network management servers 130. In response, the directory service server 140 is configured to download to the client 150 the identifications of the stored network management servers 130. The client 150 is configured to select a downloaded network management server based on the network locations of the network management servers 130 and the client 150. In one implementation, the network management server 130 is selected by determining a network management server 130 that is coupled to the same LAN to which the client 150 is coupled, so that the transmission path between a software distribution server 120 and the client 150 has a LAN transmission bandwidth.

The client 150 illustratively selects the network management server 130 by matching the client 150 sub-network address with each of the network management server 130 sub-network addresses, until the client sub-network address and a network management server sub-network address match. A matching client sub-network address and network management server sub-network address, indicate that the client 150 and the network management server 130 are coupled to the same LAN or to the same LAN sub-network. In this implementation, the network addresses are configured so that a common sub-network address indicates a location on the same LAN, or on the same LAN sub-network. A sub-network may be derived by ANDing the network address with an appropriate network or sub-network mask. The client 150 may also illustratively select the network management server 130 by determining whether both the network address of the client 150 and the network management server are within a range to indicate that they are coupled to the same LAN. In this implementation, the network addresses are configured so that an address within a certain range indicates a location on the same LAN, or on the same LAN sub-network. The client 150 may also illustratively select the network management server 130 by determining whether the client 150 and a network management server 130, each have a common Active Directory site name.

The client 150 is configured to request from the selected network management server 130 a selection criteria metric of a software distribution server 120 from which to receive (or execute) a software package. The selected network management server 130 downloads to the client a selection criteria metric of at least one software distribution server. The client 150 selects one of the downloaded software distribution servers 120 based on the downloaded selection criteria metrics. The client 150 requests that the selected software distribution server download a software package to (or execute a software package for) the client 150.

In one implementation the directory service server system 140 is configured to store a selection criteria metric of the software distribution servers 120. The client 150 is configured to request from the directory service server 140 the selection criteria metrics of the stored software distribution servers 120. In response, the directory service server 140 downloads to the client 150 the selection criteria metrics of the stored software distribution servers 120. The client 150 is configured to select a downloaded software distribution server based on the selection criteria including in one implementation the network locations of the software distribution servers 120 and the client 150. In this implementation, each software package is available on the software distribution servers 120, the availability of software packages on the software distribution server 120 is stored on the directory service server 140, and/or the client 150 is configured to examine each identified software distribution server 120 for the availability of the software package. In one implementation, the software distribution server 120 is selected by determining a software distribution server 120 that is coupled to the same LAN to which the client 150 is coupled, so that the transmission path between the software distribution server 120 and the client 150 has a LAN transmission bandwidth. In one implementation, the software distribution server 120 is selected by determining a software distribution server 120 that is coupled to the same LAN sub-network to which the client 150 is coupled, so that the transmission path between the software distribution server 120 and the client 150 has a LAN transmission bandwidth, and follows a protocol to download from a software distribution server 120 that is coupled to the same LAN sub-network to which the client 150 is coupled. In one implementation, the client is not considered to be located on a LAN if the client is connected to the LAN indirectly, such as through a telephone connection or the like, even though the client's network address may indicate that the client is coupled to the LAN. This will apply when a client is coupled to a LAN to a network through remote access service (RAS) or the like.

The client 150 illustratively selects the software distribution server 120 by matching the client 150 sub-network address with each of the software distribution server sub-network addresses, until the client sub-network address and a software distribution server sub-network address match. A match indicates that the client 150 and the software distribution server 120 are each coupled to the same LAN or to the same LAN sub-network. In this implementation, the network addresses are configured so that a common sub-network address indicates a location on the same LAN, or on the same LAN sub-network. A sub-network may be derived by ANDing the network address with an appropriate network or sub-network mask. The client 150 may also illustratively select the software distribution server 120 by determining whether the network address of the client 150 and the software distribution server are within a range to indicate that they are coupled to the same LAN. In this implementation, the network addresses are configured so that an address within a certain range indicates a location on the same LAN, or on the same LAN sub-network. The client 150 may also illustratively select the software distribution server 120 by determining whether the client 150 and a software distribution server 120 each have a common Active Directory site name. The client 150 requests that the selected software distribution server 120 download to (or execute for) the client 150 a software package.

In one implementation, the client 150 is configured to request from an assigned network management server 130 the identifications of the network management servers 130 in the assigned network management server's management hierarchy. The assigned network management server 130 is configured to download to the client 150 the identifications of the network management servers 130 in its management hierarchy. The client 150 is configured to select one of the downloaded network management servers 130 to download a software package to the client 150. The selection is based on the network locations of the client 150 and the network management servers 130. In one implementation, the network management server 130 is selected by determining a network management server 130 that is coupled to the same LAN to which the client 150 is coupled, so that the transmission path between the selected software distribution server 120 and the client 150 has a LAN transmission bandwidth. The client 150 may illustratively be configured to select the network management server 130 like the client 150 selected the network management server 130 in the implementation in which the directory service server system 140 downloads the identifications of the stored network management servers 130 to the client 150. It is possible that the client 150 is coupled to a LAN that is not coupled to any of the network management servers 130 in the management hierarchy of the assigned network management server 130. In this circumstance, the client 150 is configured to select a network management server based on other criteria.

Figure 3:
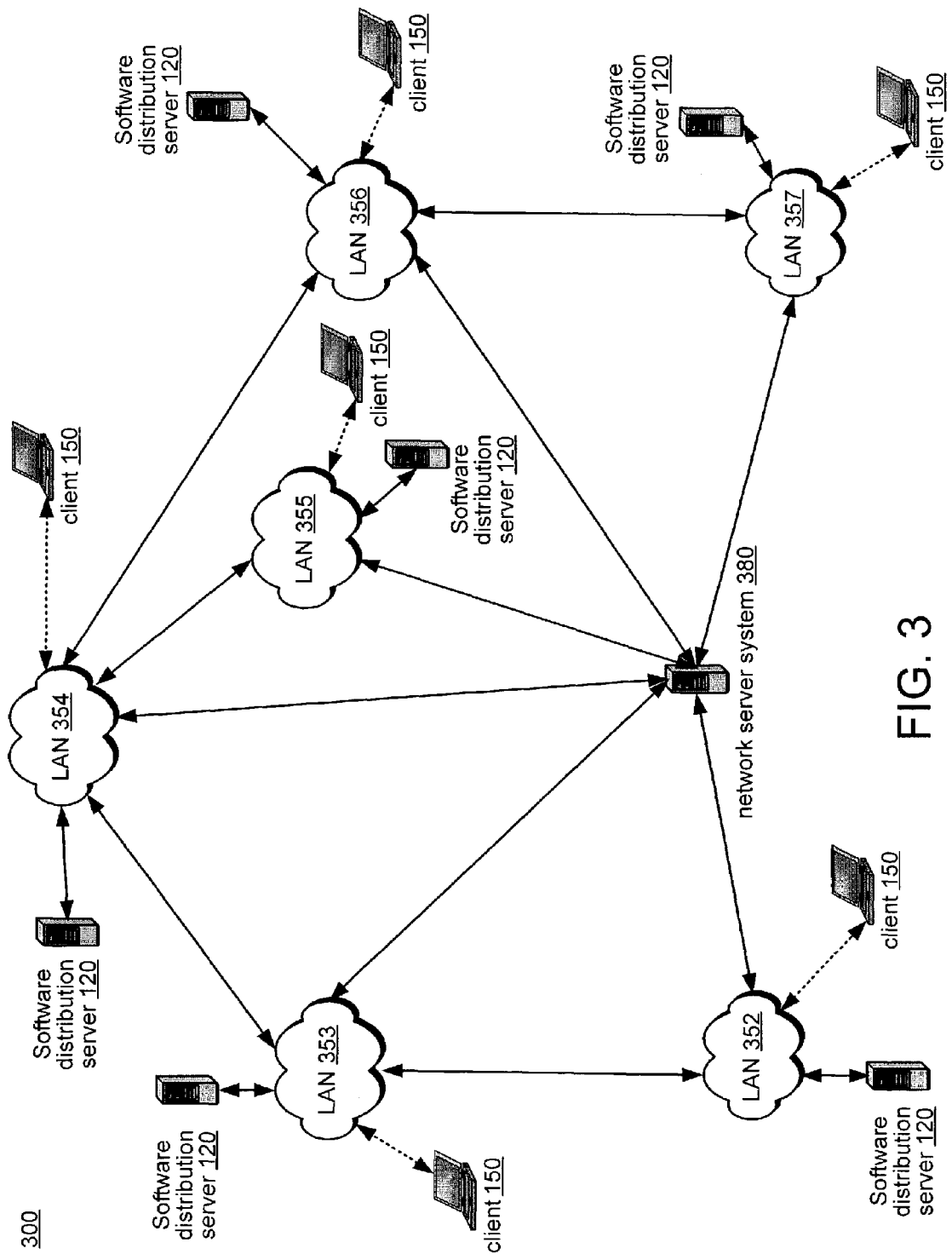
FIG. 3 portrays an exemplary network having a client coupled to the network at any of multiple locations, software distribution servers coupled to the network at multiple locations, and a network server system in order to download to the client an identification of an appropriate distribution server.

Referring now to FIG. 3, an exemplary network 300 includes multiple local area networks (LANs) 352, 353, 354, 355, 356, 357. Each LAN 352, 353, 354, 355, 356, and 357 is coupled to one another in an exemplary configuration.

Each LAN 352, 353, 354, 355, 356, and 357 includes a coupled separate software distribution server 120. The data that a software distribution server 120 stores and downloads is commonly termed a "software distribution package," and a "software package."

At least one client 150 can be coupled to the network 300. Each portrayed client 150 is a "roaming client," able to couple to the network 300 at any of the LANs 352, 353, 354, 355, 356, and 357, one LAN at any time. Thus, a dashed line portrays the coupling of the client 150 to the LANs 352, 353, 354, 355, 356, 357, indicating that each roaming client 150 couples to the network 300 at one network location at a time. As described with reference to FIG. 2, the client 150 may be a laptop computer whose operator may roam from one network location to another, and couple the client 150 to the network 300 in order for the client 150 to receive a software package from a software distribution server 120. As shall be described below, a coupled network server system 180, and the client 150, are configured to enable a specific software distribution server 120 accessing, including at least one of downloading a software package to, or executing a software package for, the client 150. The specific software distribution server 120 is dynamically selected based on the network locations of the client 150, and the software distribution servers 120.

The network server system 180 is coupled to the network 300 at illustratively the LANs 352, 353, 354, 355, 356, and 357. The network server system 180 comprises individually distinct servers each coupled to one of the LANs 352, 353, 354, 355, 356, and 357.

The network server system 180 is configured to store a selection criteria metric of each software distribution server 120 on the network 300. The client 150 is configured to query the second server system 180 for a selection criteria metric of each software distribution server 120 on the network 300. The network server system 180 in response downloads to the requesting client 150 the selection criteria metrics of the stored software distribution servers 120.

The client 150 is configured to determine a specific software distribution server 120 for requesting a download of a software package to the client 150 (or a executing of the software package for the client 150). The client 150 is configured to select the specific software distribution server 120, based on the network locations of the software distribution servers 120 and the client 150 (and/or the other selection criteria). In one implementation, the client 150 selects the specific software distribution server 120 based on providing a transmission path between the specific software distribution server 120 and the client 150 that has a specific bandwidth. In one implementation, the client 150 selects the specific software distribution server 120, based on the transmission path between the specific software distribution server 120 and the client 150 having a LAN bandwidth. In one implementation, the client 150 selects the specific software distribution server 120, based on the specific software distribution server 120 being coupled to the same LAN to which the client 150 is coupled, so that the transmission path between the specific software distribution server 120 and the client 150 has a LAN transmission bandwidth. In one implementation, the client 150 selects the specific software distribution server 120 based on the specific software distribution server 120 being coupled to the same LAN sub-network to which the client 150 is coupled, so that the transmission path between the specific software distribution server 120 and the client 150 has a LAN transmission bandwidth, and follows a protocol to download from a software distribution server 120 that is coupled to the same LAN sub-network as the client 150. The client 150 requests from the specific software distribution server 120 a download of a software package to the client 150 (or a executing of a software package for the client 150). In one implementation, the client is not considered to be located on a LAN if the client is connected to the LAN indirectly, such as through a telephone connection or the like, even though the client's network address may indicate that the client is coupled to the LAN. This will apply when a client is coupled to a LAN to a network through remote access service (RAS) or the like.

In one implementation, the network server system 180 comprises both at least one directory service server. 140 and at least one network management server 130. The directory service server 140, and the network management server 130, are each described in greater detail with reference to FIGS. 1 and 2. Each network management server 130 stores a selection criteria metric of software distribution servers 120 that are coupled to the same LAN as the network management server 130. Each network management server 130 is configured to download to the directory service server 140 an identification of the network management server 130. The directory service server 140 receives the identifications of the network management servers 130, and stores these received identifications. The client 150 is configured to request from the directory service server 140 the stored network management server identifications. The directory service server 140, in response to this request, downloads to the client 150 the stored network management server identifications. The client 150 is configured to select a specific network management server 130 based on the network management server 130 being coupled to the same LAN to which the client 150 is coupled, so that the transmission path between the selected software distribution server 120 and the client 150 will have a LAN bandwidth. The client 150 is configured to request from the specific network management server 130 an identification of at least one stored software distribution server 120 that is coupled to the same LAN to which the network management server 130 is coupled. The network management server 130 downloads to the client a selection criteria metric of the software distribution servers 120. The client 150 is configured to request a download (or a executing) of a software package from a selected software distribution server 120.

In one implementation, the network server system 180 comprises at least one directory service server 140. The directory service server 140 stores the selection criteria metric of each software distribution server 120. In response to a request from a client 150 for the identifications of the stored software distribution servers 120, the directory service server 140 downloads to the client the selection criteria metric of the software distribution servers 120. The client 150 is configured to select a specific software distribution server 120 for requesting a download to the client 150 of a software package (or a executing of the software package for the client 150). In one implementation, the client 150 selects the specific software distribution server 150 based on the selection criteria of the selection criteria metric. In one implementation the client 150 selects the specific software distribution server 120 based on the network locations of the software distribution servers 120 and the client 150. In one implementation, the client 150 selects the specific software distribution server 120 based on providing a transmission path between the specific software distribution server 120 and the client 150 that has a specific bandwidth. In one implementation, the client 150 selects the specific software distribution server 120 so that the transmission path between the software distribution server 120 and the client 150 will have a LAN transmission bandwidth. In one implementation, the client 150 selects the specific software distribution server 120 based on the specific software distribution server 120 being coupled to the same LAN to which the client 150 is coupled, so that the transmission path between the specific software distribution server 120 and the client 150 has a LAN transmission bandwidth. In one implementation, the client 150 determines the specific software distribution server 120 based on the specific software distribution server 120 being coupled to the same LAN sub-network to which the client 150 is coupled, so that the transmission path between the specific software distribution server 120 and the client 150 has a LAN transmission bandwidth, and follows a protocol to download from a software distribution server 120 that is coupled to the same LAN sub-network as the client 150. In one implementation, the client is not considered to be located on a LAN if the client is connected to the LAN indirectly, such as through a telephone connection or the like, even though the client's network address may indicate that the client is coupled to the LAN. This will apply when a client is coupled to a LAN to a network through remote access service (RAS) or the like. The client 150 requests from the specific software distribution server 120 a download of a software package to the client 150 (or a executing of a specific software package for the client 150).

In one implementation, the network server system 180 comprises at least one network management server 130 assigned to the client 150 as a network managing server 130, and network management servers 130 below the assigned network management server 130 configured in a management hierarchy. A management hierarchy is described and portrayed with reference to FIG. 2. The assigned network management server 130 stores the identifications of each network management server 130 below the assigned network management server 130 in the hierarchy. The client 150 is configured to request from the assigned network management server 130 the stored network management server identifications in the management hierarchy. The assigned network management server 130 in response to this request, is configured to download to the client 150 the stored network management server identifications.

The client 150 selects a specific network management server 130 so that the network management server 130 is coupled to the same LAN to which the client 150 is coupled. By selecting a network management server 130 coupled to the same LAN as the client, the software distribution server whose identification is stored in the specific network management server 130, will have a LAN transmission bandwidth to the client 150. The client 150 requests from the specific network management server 130 an identification of at least one stored software distribution server 120 that is coupled to the same LAN to which the network management server 130 is coupled. The network management server downloads to the client a selection criteria metric of the software distribution servers 120. The client 150 requests a download (or a executing) of a software package from a selected software distribution server 120. It is possible that the client 150 is coupled to a LAN that is not coupled to any of the network management servers 130 in the management hierarchy of the assigned network management server 130. In this circumstance, the client 150 is configured to select a network management server based on other criteria.

Figure 4A:
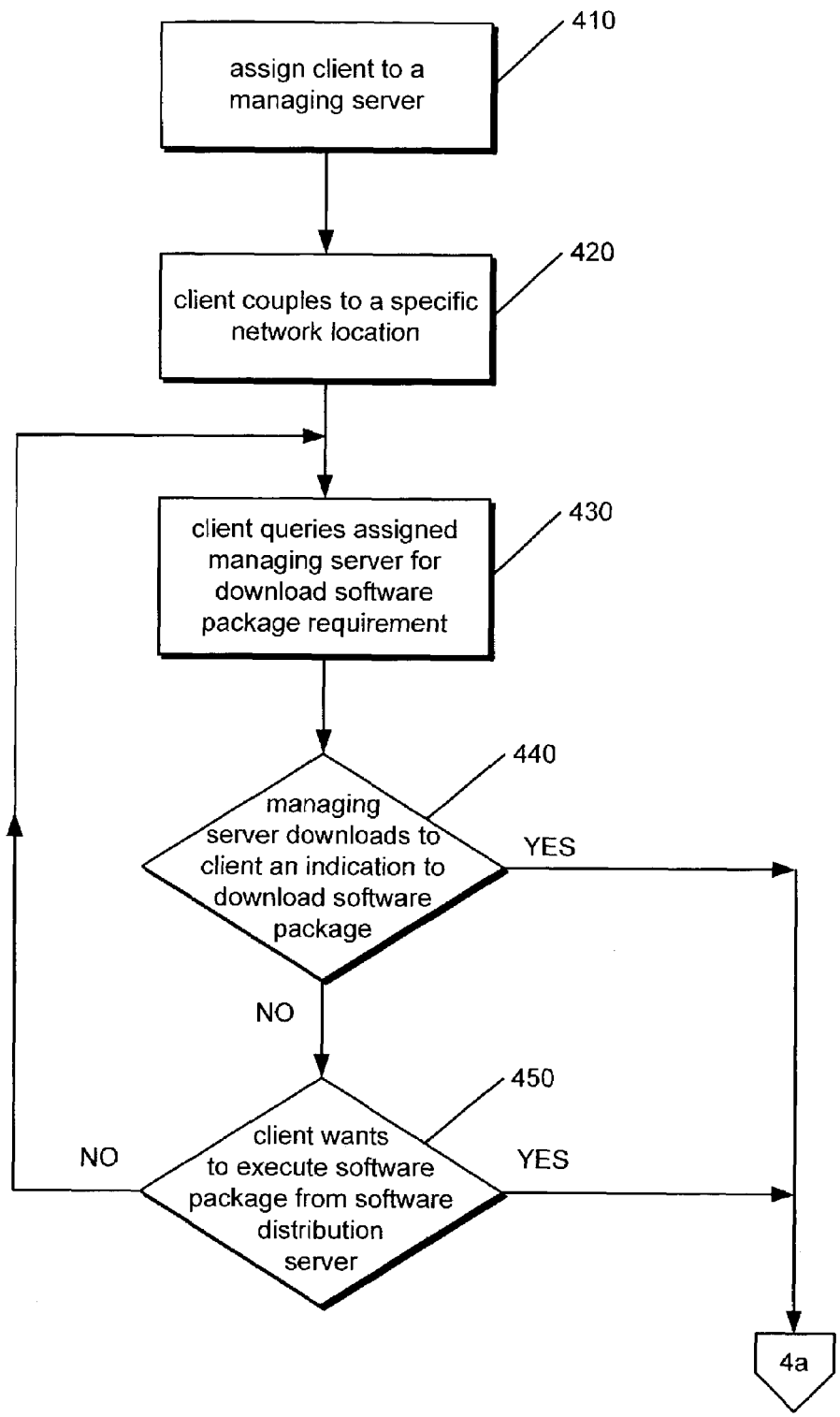
FIG. 4A-4B is a flow chart portraying an exemplary method of a client selecting a software distribution server whose identifications are stored in a network server system, by coupling to a network at any location, and selecting a software distribution server based on the locations of the client and the software distribution server.
Figure 4B:
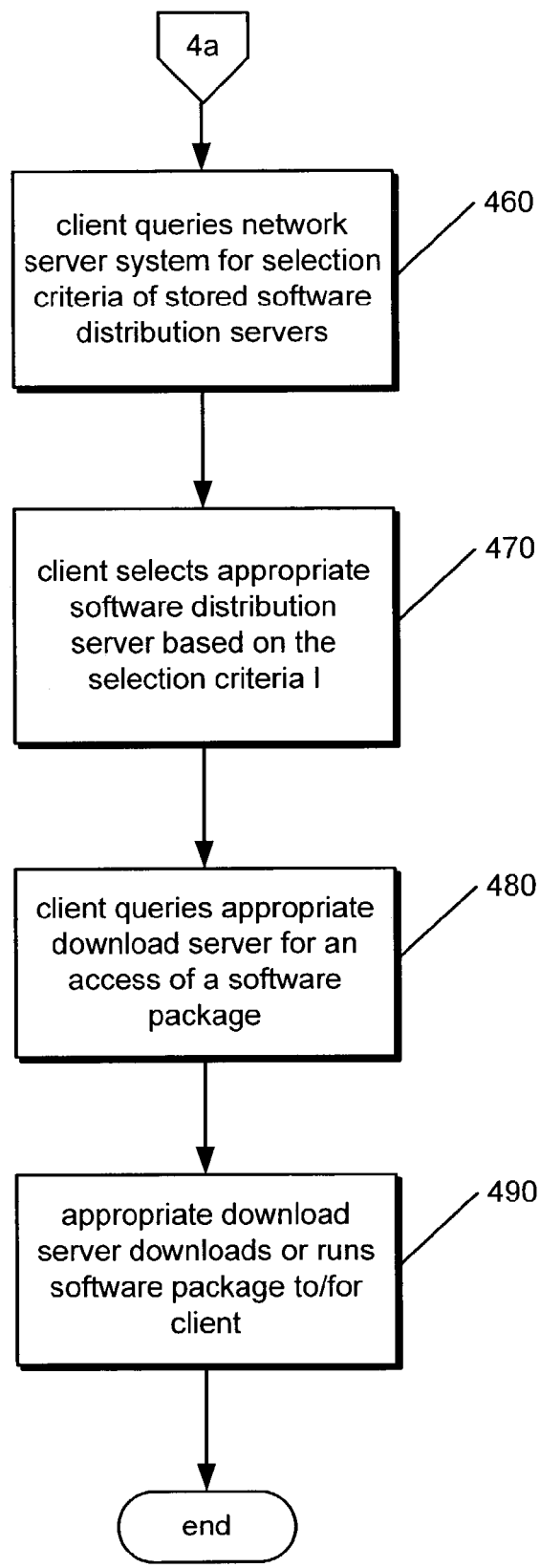

Referring now to FIGS. 4A-4B, a network includes coupled software distribution servers 120, coupled network management servers 130, and a coupled network server system 180 as described with reference to FIGS. 1-3. In block 410, a network client 150 is assigned to a network management server 130. Generally, the assignment of a client 150 to a network management server 130 is part of a network initialization procedure for each client, and may be executed online by a handshake operation between the client 150 and a specific network management server 130, or alternatively off-line by a human operator manually inputting data into the client 150. In this action, the client 150 may be initialized with data identifying the specific client 150 to the assigned network management server 130, an operation dependant upon the protocols of a specific network. In this action, the client 150 is initialized with the network address (or other identifying network location) of the assigned network management server 130. In one implementation, a network management server 130 is assigned to a client 150 as well, and initializes its assigned client database to include the client 150. Conventionally, a network management server 130 stores the software configuration of each assigned client 150. A client 150 is configured to query the assigned network management server 130 for policy instructions, e.g. whether it is appropriate to install or to update a software package, what is the identity of the software package to install, and when to install that software package. In one implementation, the network management server 130 transmits to its assigned clients 150 a notification to install or to update software packages based on the stored configuration of the client 150 and the specific network configuration management processes.

In block 420, a computer couples to the network at any network location to operate as a client 150. As described with reference to FIG. 2, the network includes at least one LAN, each LAN coupled to one another by illustratively a connecting WAN. The client 150 couples to a specific LAN of the network, and thus has a network address.

In block 430, the client 150 queries the assigned network management server 130 whether there are any software distribution packages to be downloaded to the client 150. The query includes both whether there is a new software package to download to the client 150, and whether there is an update to a software package already stored in the client 150 to download to the client 150. In one implementation, the client 150 queries the assigned network management server 130 initially upon a startup operation, and periodically thereafter. In one implementation, the client 150 queries the assigned network management server 130 in response to joining the network upon moving from one network location to another, and/or upon moving from one LAN to another. If there is a software distribution package to be downloaded to the client 150, then the "YES" branch is taken in block 460. If there is not a software distribution package to be downloaded to the client 150, then the "NO" branch is taken in block 440 to block 450. In block 450, if the client 150 desires to execute a software package from the software distribution server 120, then the "YES" branch is taken to block 460. If the client does not desire to execute a software package and if there is not a software distribution package to be downloaded to the client 150, then the "NO" branch is taken in block 450, and block 430 is re-executed. In one implementation, the network management server 130 notifies the client 150 whether there is a software distribution package to be downloaded to the client rather than, or as well as, the client 150 querying the network management server 130 as depicted in block 430.

In block 460 the client 150 queries the network server system 180 for stored selection criteria of software distribution servers 120.

In block 470, the client 150 selects a software distribution server 120 from which to request an access characterized by at least one of a download of a software distribution package to the client 150 and an execution of the software distribution package for the client 150. The selection is based on the selection criteria such as the network locations of the client 150 and the software distribution servers 120. In one implementation the client 150 selects a software distribution server 120 based on the quantity of hops from one network sub-region to another network sub-region. In one implementation the client 150 selects a software distribution server 120 that is coupled to the network such that the transmission path between the client 150 and the software distribution server 120 has a LAN bandwidth. In one implementation, the client 150 selects a software distribution server 120 that is coupled to the same LAN to which the client 150 is coupled, so that the LAN will be the transmission path for the to-be downloaded software package, and the to-be downloaded software package will be transmitted to the client 150 at a LAN transmission rate. In one implementation, the client 150 selects the software distribution server 120 that is coupled to the same LAN sub-network to which the client 150 is coupled. The client 150 selects the software distribution server 120 that is coupled to the same LAN sub-network to which the client 150 is coupled so that the LAN sub-network will be the transmission path for the to-be downloaded software package, and the to-be downloaded software package will be transmitted to the client 150 at a LAN transmission rate and follow a protocol to download from a software distribution server 120 coupled to the same LAN sub-network as the client 150. In one implementation, the client is not considered to be located on a LAN if the client is connected to the LAN indirectly, such as through a telephone connection or the like, even though the client's network address may indicate that the client is coupled to the LAN. This will apply when a client is coupled to a LAN to a network through remote access service (RAS) or the like.

In block 480, the client queries the selected software distribution server 120 for downloading (or executing) the software package. In block 490 the software distribution server 120 downloads the software package to the client 150 (or executes the software package for the client 150). While in this description we refer to the software distribution server 120 as downloading the software package to the client 150, in one implementation the downloading is initiated by the client requesting the downloading, so that the client 150 may be thought of as downloading the software package as well, in that the client 150 and the software distribution server 120 operate in tandem for the software distribution server 120 to transmit the software package to the client 150.

Figure 5A:
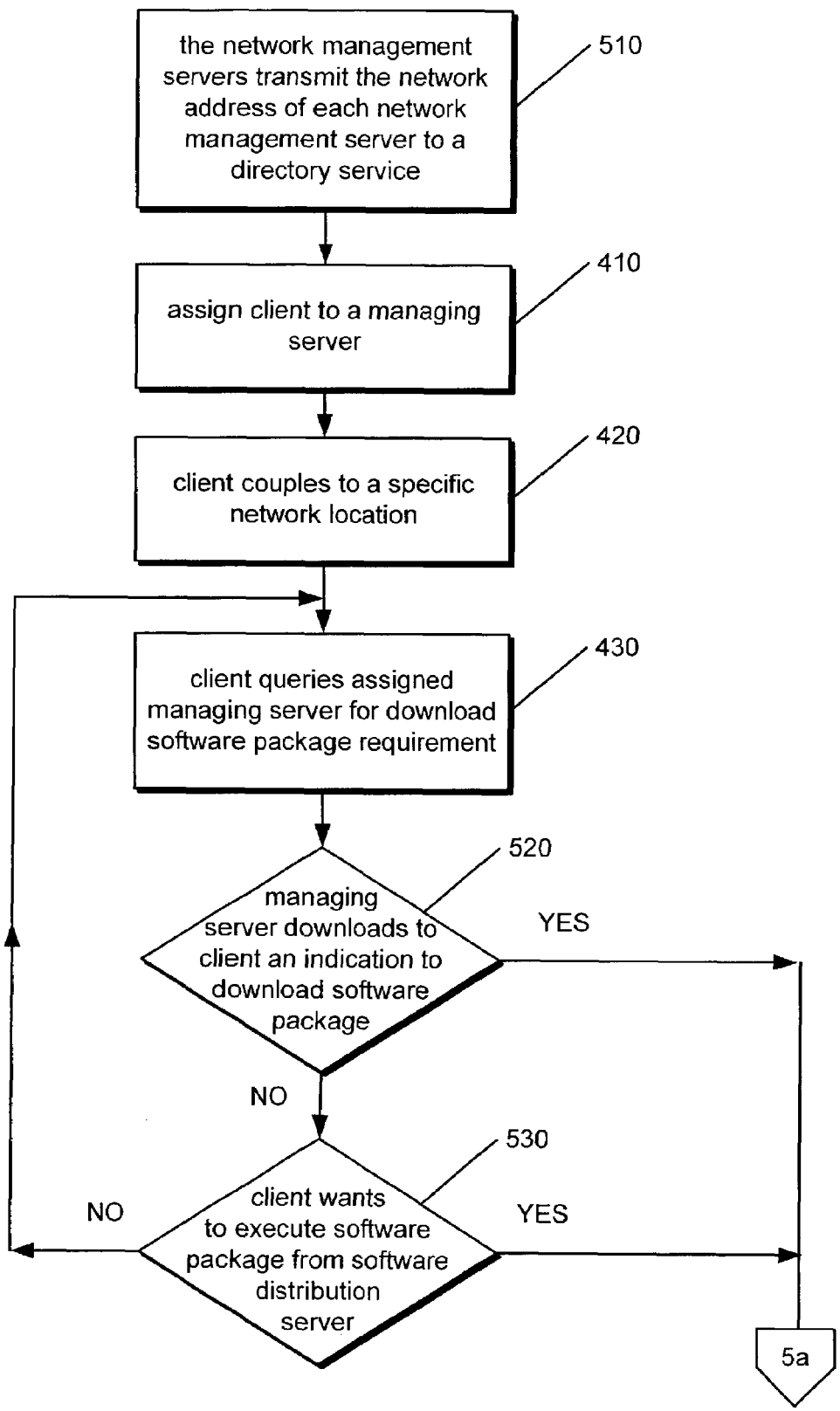
FIGS. 5A-5C is a flow chart portraying an exemplary method of a client selecting a software distribution server by coupling to a network at any location, downloading from a directory service identifications of network management servers coupled to the network, selecting a network management server, and downloading from the network management server an identification of a software distribution server.
Figure 5B:
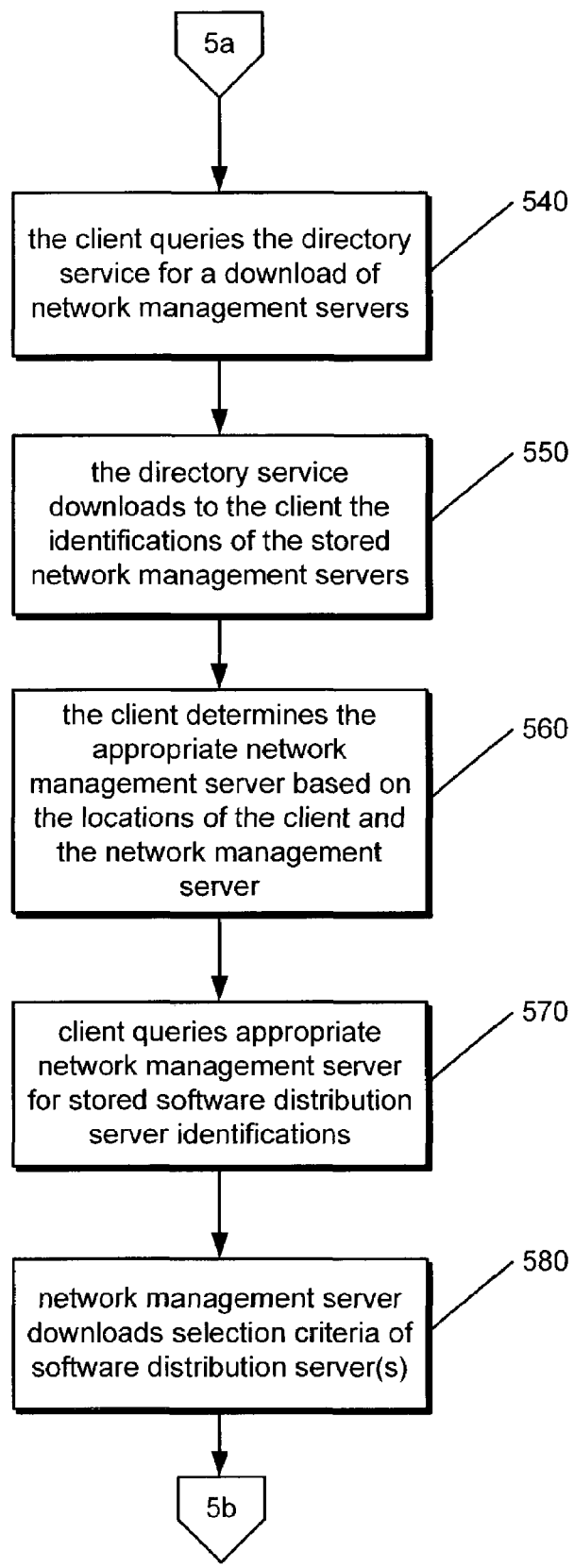
Figure 5C:
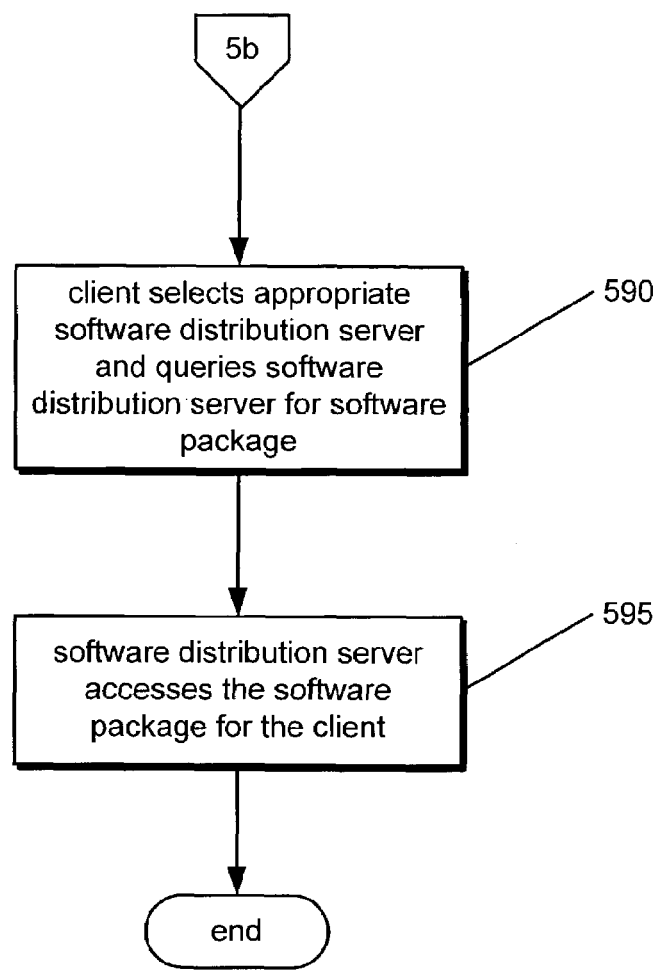

Referring to FIGS. 5A-5C, a network includes coupled software distribution servers 120, coupled network management servers 130, and coupled directory service servers 140, as described with reference to FIGS. 1-3. In block 510, the network management server 130 transmits to a directory service server 140 an identification of the network management servers 130 on the network, or the identification of the software distribution servers 120 on the network. In one implementation in which the client 150 is configured to request from the directory service 140 an identification of the network management servers 130, the network management servers 130 transmit to the directory service server 140 the identification of the network management servers 130. In one implementation in which the client 150 is configured to request from the directory service 140 an identification of the software distribution server(s) 120, the network management servers 130 transmit to the directory service server 140 the identifications of the software distribution servers 120 that each network management server 130 administers. Thereafter, the network management servers 130 transmit to the directory service server 140 any updates of the identification of the network management servers 130, or the selection criteria metric of the software distribution servers 120, so that the directory service server(s) 140 stores the current identification of each network management server 130, or the selection criteria metric of the software distribution server 120.

In blocks 410, 420, and 430, the client 150 is assigned to a network management server 130, the client respectively couples to the network at any network location, and the client 150 queries the assigned network management server 130 whether there is a software distribution package to be downloaded to the client 150. The actions of blocks 410, 420, and 430 are described more fully with reference to FIGS. 4A-4B above. If there is a software distribution package to be downloaded to the client 150, then the "YES" branch is taken in block 520, and block 540 is executed. If there is not a software distribution package to be downloaded to the client 150, then the "NO" branch" is taken in block 520 to block 530. In block 530, if the client 150 desires to execute a software package from the software distribution server 120, then the "YES" branch is taken to block 500. If the client does not desire to execute a software package and if there is not a software distribution package to be downloaded to the client 150, then the "NO" branch is taken in block 530, and block 430 is re-executed. In one implementation, the network management server 130 notifies the client 150 whether there is a software distribution package to be downloaded to the client rather than, or as well as, the client 150 querying the network management server 130 as represented by block 430.

In block 540, the client 150 queries a directory service server 140 for an identification of the network management servers 130 on the network. In block 550, the directory service downloads to the client 150 the identification of the network management servers 130.

In block 560, the client 150 selects a network management server 130 from the downloaded network management servers 130, from which to request an identification of a software distribution server 120 based upon network locations of the coupled client 150 and network management servers 130. In this implementation, each LAN is coupled to a network management server 130, as well as to at least one software distribution server 120. Each network management server 130 stores the network location of each software distribution server 120 that is coupled to the same LAN to which the network management server 130 is coupled. The selected network management server 130 is the network management server 130 that is coupled to the same LAN as the client 150. That network management server 130 stores the network location and other selection criteria of each software distribution server that is coupled to the same LAN to which the client 150 is coupled, and which will transmit a downloaded software package to the client at LAN data rates.

The client 150 illustratively selects the network management server 130 by matching the client 150 sub-network address with each of the network management server sub-network addresses until the client sub-network address and a network management server sub-network address match. A match indicates that the client 150 and the network management server 130 are coupled to the same LAN or to the same LAN sub-network. In this implementation, the network addresses are configured so that a common sub-network address indicates a location on the same LAN, or on the same LAN sub-network. A sub-network may be derived by ANDing the network address with an appropriate network or sub-network mask. The client 150 may also illustratively select the network management server 130 by determining whether the network address of the client 150, and the network management server 130, are both within a range to indicate that they are coupled to the same LAN. In this implementation, the network addresses are configured so that an address within a certain range indicates a location on the same LAN, or the same LAN sub-network. The client 150 may also illustratively select the network management server 130 by determining whether the client 150 and a network management server 120 each have a common Active Directory site name.

In block 570, the client 150 queries the selected network management server 130 for a software distribution server 120. In block 570, the selected network management server 130 downloads to the client the selection criteria metrics of the software distribution servers 120.

In block 590, the client 150 selects a software distribution server 120 based the selection criteria metrics. In one implementation the client 150 selects a software distribution server 120 based on the quantity of hops from one network sub-region to another network sub-region. In one implementation, the client 150 selects a software distribution server 120 based upon providing a transmission path between the specific software distribution server 120 and the client 150 that has a specific bandwidth. In one implementation, the client 150 selects the specific software distribution server 120 so that the transmission path between the specific software distribution server 120 and the client 150 have a LAN bandwidth. In one implementation, the client 150 selects the specific software distribution server 120 so that the specific software distribution server 120 is coupled to the same LAN to which the client 150 is coupled, and the transmission path between the specific software distribution server 120 and the client 150 has a LAN transmission bandwidth. In one implementation, the client 150 selects the specific software distribution server 120 so that the specific software distribution server 120 is coupled to the same LAN sub-network to which the client 150 is coupled, and the transmission path between the specific software distribution server 120 and the client 150 has a LAN transmission bandwidth, and follows a protocol to download from a software distribution server 120 that is coupled to the same LAN sub-network as the client 150. The client 150 requests the selected software distribution server download to the client 150 the software package (or execute the selected software package). In block 595, the software distribution server 120 accesses the software package for the client 150 characterized by downloading the software package to the client 150 or executing the software package for the client 150. As described with reference to FIG. 4, we refer to the software distribution server 120 as downloading the software package to the client 150, but in one implementation the downloading is initiated by the client requesting the downloading, so that the client 150 may be thought of as downloading the software package as well, in that the client 150 and the software distribution server 120 operate in tandem for the software distribution server 120 to transmit the software package to the client 150.

In one implementation, the client is not considered to be located on a LAN if the client is connected to the LAN indirectly, such as through a telephone connection or the like, even though the client's network address may indicate that the client is coupled to the LAN. This will apply when a client is coupled to a LAN to a network through remote access service (RAS) or the like.

Figure 6A:
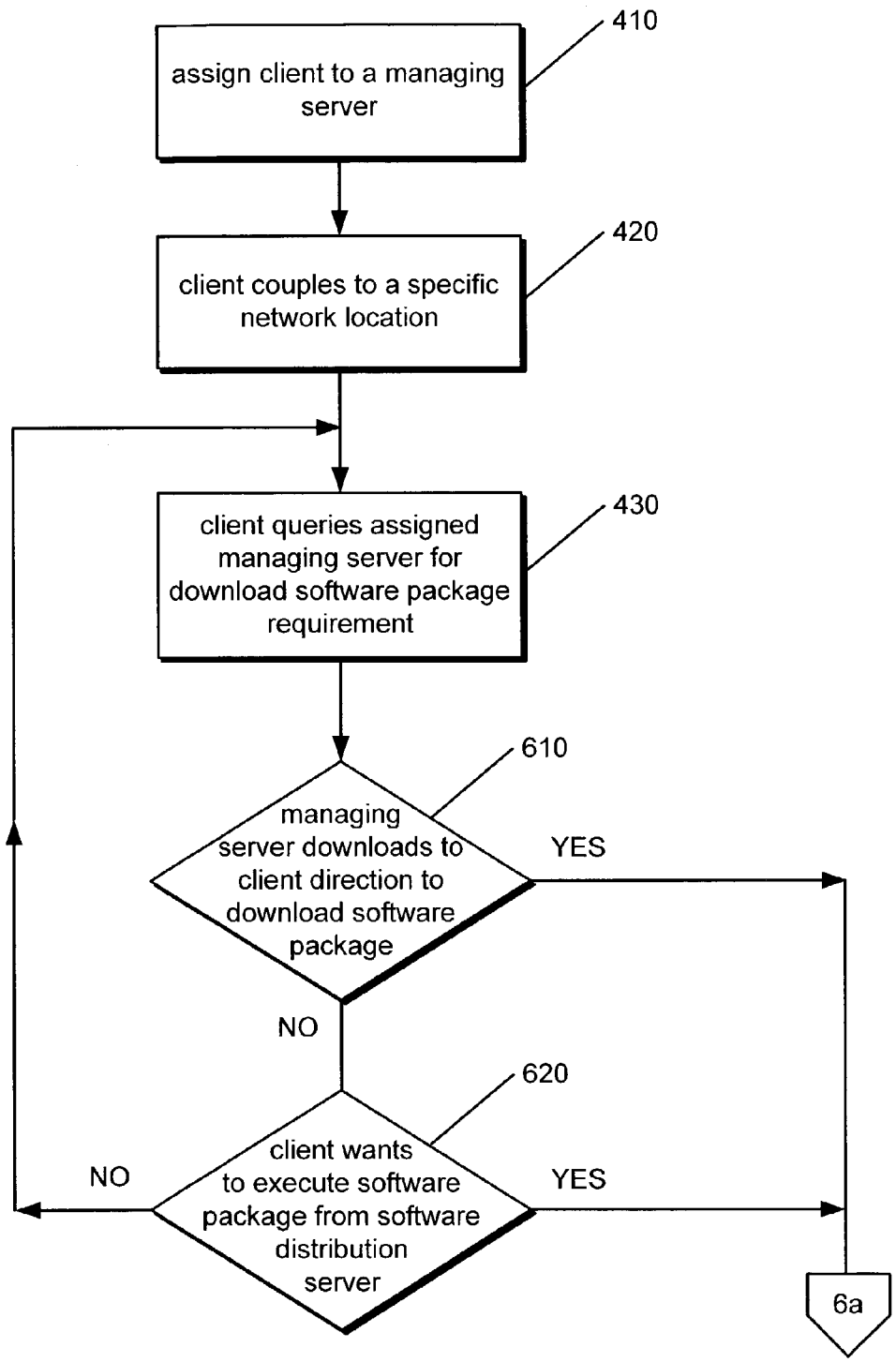
FIGS. 6A-B is a flow chart portraying an exemplary method of a client coupling to a network at any location, downloading from an assigned network management server an identification of a network management server that stores an identification of an appropriate software distribution server, and downloading or executing software from a software distribution server identified by the network management server.
Figure 6B:
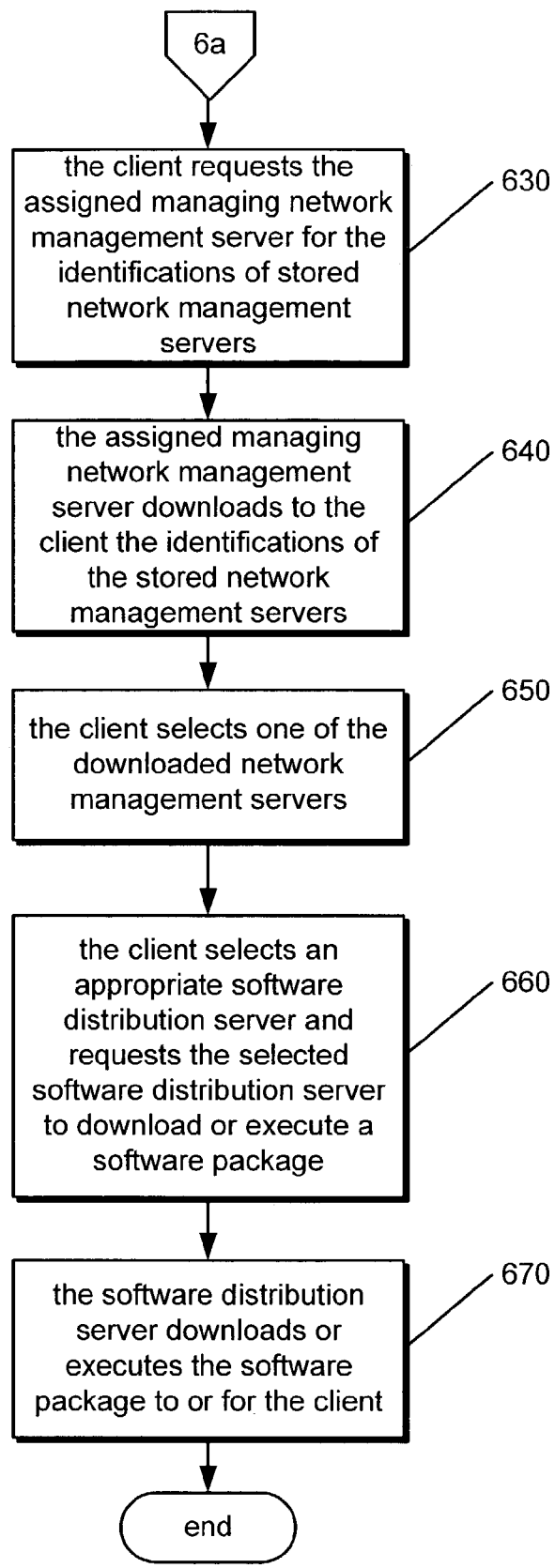

Referring to FIGS. 6A-6B, a network includes coupled software distribution servers 120 and network management servers 130, as described with reference to FIGS. 2 and 3, in which an assigned network management server 130 is at the top of a network management server management hierarchy. In the network management server management hierarchy, the assigned management server 130 stores the network location of each management server 130 below the assigned network management server 130 in the hierarchy In blocks 410, 420, and 430, the client 150 is assigned to a network management server 130, the client respectively couples to the network at any network location, and the client 150 queries the assigned network management server 130 whether there is a software distribution package to be downloaded to the client 150. The actions of blocks 410, 420, and 430 are described more fully with reference to FIGS. 4A-4B above. If there is a software distribution package to be downloaded to the client 150, then the "YES" branch is taken in block 610 and block 630 is executed. If there is not a software distribution package to be downloaded to the client 150, then the "NO" branch is taken in block 610 to block 620. In block 620, if the client desires to execute a software package from the software distribution server 120, then the "YES" branch is taken to block 630. If the client does not desire to execute a software package and if the is not a software distribution package to be downloaded to the client 150, then the "NO" branch is taken in block 620, and block 430 is re-executed. In one implementation, the network management server 130 notifies the client 150 whether there is a software distribution package to be downloaded to the client, rather than or as well as, the client 150 querying the network management server 130 as depicted with reference to block 430.

In block 630, in one implementation the client 150 requests from an assigned network management server 130 the identifications of the network management servers 130 that are in the assigned network management server's management hierarchy. In block 640, the assigned network management server 130 downloads to the client 150 the identifications of the network management servers 130 in its management hierarchy.

In block 650, the client 150 selects one of the downloaded network management servers 130 to download the software distribution server identifications to the client 150. The selection is based on the network locations of the client 150 and the network management servers 130. In one implementation, the network management server 130 is selected by determining a network management server 130 that is coupled to the same LAN to which the client 150 is coupled, so that the transmission path between a software distribution server 120 and the client 150 has a LAN transmission bandwidth. The client 150 may illustratively select the network management server 130 by matching the client 150 sub-network address with each of the network management server sub-network addresses until the client sub-network address and a network management server sub-network address match. A match indicates that the client 150 and the network management server 130 are coupled to the same LAN or to the same LAN sub-network. In this implementation, the network addresses are configured so that a common sub-network address indicates a location on the same LAN, or on the same LAN sub-network. A sub-network may be derived by ANDing the network address with an appropriate network or sub-network mask. The client 150 may also illustratively select the network management server 130 by determining whether the network address of the client 150 and the network management server 130 are within a range to indicate that they are coupled to the same LAN. In this implementation, the network addresses are configured so that an address within a certain range indicates a location on the same LAN, or the same LAN sub-network. The client 150 may also illustratively select the network management server 130 by determining whether the client 150 and a network management server 120 each have a common AD site name. It is possible that the client 150 is coupled to a LAN that is not coupled to any of the network management servers 130 in the assigned network management server management hierarchy. In this circumstance, the client 150 is configured to select a network management server based on other criteria. In one implementation, the client is not considered to be located on a LAN if the client is connected to the LAN indirectly, such as through a telephone connection or the like, even though the client's network address may indicate that the client is coupled to the LAN. This will apply when a client is coupled to a LAN to a network through remote access service (RAS) or the like.

In block 660 the client requests the software distribution server 120 for the software package based on the network locations of the software distribution servers 120 and the client 150. In a LAN having multiple sub-networks, the software distribution is selected so that the selected software distribution server 120 and the client 150 are each coupled to the same sub-network. In block 670 the software distribution server 120 downloads the software package to (or executes the software package for) the client 150. As described with reference to FIGS. 4 and 5, in this description we refer to the software distribution server 120 as downloading the software package to the client 150, in one implementation the downloading is initiated by the client requesting the downloading, so that the client 150 may be thought of as downloading the software package as well, in that the client 150 and the software distribution server 120 operate in tandem for the software distribution server 120 to transmit the software package to the client 150.

In the preceding descriptions referenced to FIGS. 1, 2, 3, 4A-4B, 5A-5C, and 6A-6B, the software distribution servers 120, and the network management servers 130, have been represented and associated with an "identification." Commonly, this "identification" is a network location, such as a network address. Otherwise, the network location is determined from the "identification," such as by accessing a Domain Name System (DNS) server application to obtain the network location associated with the "identification." Thus an "identification" is equivalent to a network address and a network location.

In the preceding descriptions referenced to FIGS. 1, 2, 3, 4A-4B, 5A-5C, and 6A-6B, a network management server 130 has been described as storing the identifications of software distribution servers 120. However, a network management server 130 may also be configured to store software distribution packages, and to download at least one of the software distribution packages to a requesting client 150. As such, a network might be coupled to network management servers 130 for downloading software distribution packages to the client 150, rather than the network coupling to additionally separate software distribution servers 120. In this instance, the implementations and descriptions herein would incorporate a network management server 130 for the functions ascribed to a separate software distribution server 120.

The phraseology and terminology used is for the purpose of description and should not be regarded as limiting. The language in the patent claims may not capture every nuance, or describe with complete precision the range of novelty. Moreover, it is understood that the depicted acts in any described method are not necessarily order dependent, and in an implementation there may be intervening acts.

The present invention is not limited by what has been particularly shown and described herein above. Illustratively, the network management server system may in an implementation select the network management server and/or software distribution server rather than the client selecting the network management server and/or the software distribution server. The directory server system may in an implementation select the software distribution server/and or the network management server rather than the client selecting the network management server. And/or the software distribution server, and the second server system may in an implementation select the software distribution server, rather than the client selecting the software distribution server. In an implementation, the directory server system stores software distribution server identifications rather than network management server identifications and select the software distribution server identification, or download to the client the software distribution server identifications, rather than network management server identifications.

The specific features and operations are disclosed as exemplary forms of implementing the claimed subject matter. Therefore, the scope of the invention is defined by the claims which follow.

We claim:

1. A network comprising:
   multiple network sub-regions connected to one another;
   multiple software distribution servers configured to store and to access a software package, the access characterized by at least one of a download of the software package to a client and an execution of the software package for a client, each software distribution server coupled to one of the sub-regions at a network location; and
   the client coupled to one of the sub-regions at a network location, and configured to request an access of at least one of the software packages for the client from one of the software distribution servers based on at least one criterion; and
   one or more network management servers coupled to each sub-region and configured to store a network location of at least one of the software distribution servers coupled to the network, and to download at least one of the software distribution server locations to the client.

2. The network recited in claim 1 wherein the network is a WAN.

3. The network recited in claim 1 further comprising:
   a directory service server configured to store a network location of each of the one or more network management servers, and to download each stored network location to the client; and
   the client further configured to request the network locations of the one or more network management servers from the directory service server, select a network management server, and request that the selected network management server download to the client the network locations of the stored software distribution servers.

4. The network recited in claim 3 wherein if at least one of the network management servers downloads a multiple number of software distribution server locations, the client is further configured to select one of the downloaded software distribution servers for requesting an access of the software package that is based on the network locations of the software distributions servers and the client.

5. The network recited in claim 1 wherein each of the sub-regions is a LAN.

6. The network recited in claim 5 wherein the criterion includes the network location of the client and the network locations of the software distribution servers.

7. The network recited in claim 5 wherein the LANs are connected to one another by WANs, and further comprising the WANs.

8. The network recited in claim 5 further comprising:
   a directory service server configured to store network locations of the one or more network management servers, and to download each stored network location to the client; and
   the client further configured to request the network locations of the one or more network management servers from the directory service server, select a network management server based on the network management server being coupled to the same LAN to which the client is coupled, and to request that the selected network management server download to the client the network location of the stored software distribution servers.

9. The network recited in claim 8 wherein if the network management server downloads a multiple number of software distribution server locations, the client is further configured to select one of the downloaded software distribution servers from which to request an access of the software package based on the network locations of the software distributions servers and the client.

10. The network recited in claim 5 further comprising:
    a multiple number of network management servers,
    wherein one of the network management servers is configured to manage the client, and
    store a network address of the other network management servers; and each network management server is coupled to a different LAN of the network, and configured to store a network location of each software distribution server coupled to the same LAN to which the network management server is coupled, and to download to the client the network location of the software distribution servers; and
    the client is further configured to request from the network management server configured to manage the client the network locations of each network management server, select a network management server such that the selected management server is coupled to the same LAN to which the client is coupled if any network management server is coupled to the same LAN to which the client is coupled; and to request the selected network management server download to the client the network location of the software distribution servers.

11. A method of a client accessing a software package from one of a plurality of software distribution servers on a network comprising more than one sub-region, each sub-region including at least one network management server configured to store the identities of the software distribution servers in the sub-region, the accessing characterized by at least one of downloading the software package to the client and executing the software package for the client, the method comprising:

coupling the client to one of the sub-regions;

selecting a software distribution server using at least the identifications stored on the at least one network management server, wherein the selection is based on a selection criteria; and accessing the software package from the selected software distribution server for the client.

12. The method recited in claim 11 wherein the network is a WAN.

13. The method recited in claim 12 wherein the selection criteria include minimizing the quantity of hop for a transmission from the software distribution server to the client.

14. The method recited in claim 11 wherein the sub-regions are LANs.

15. The method recited in claim 14 wherein the selection criterion comprises selecting a software distribution server coupled to the same LAN to which the client is coupled.

16. The method recited in claim 15, wherein the network further comprises a directory service server coupled to the network, and each of the at least one network management server is couple to a corresponding LANS and configured to store an identification of the software distribution servers coupled to the same LAN, and wherein the selecting a software distribution server further comprises storing the identifications of the network management servers on the directory server;

selecting the stored network management server that is coupled to the same LAN to which the client is coupled based on the identifications; and querying the selected network management server for an identification of a stored software distribution server.

17. The method recited in claim 16 wherein if the selected network management server stores more than one identification, the querying includes selecting one of the identifications of the software distribution server.

18. The method recited in claim 17 wherein the selecting one of the identifications of the software distribution server further includes selecting a software distribution server coupled to a same LAN sub network to which the client is coupled.

* * * * *